United States Patent
Jin et al.

(10) Patent No.: US 10,416,848 B2
(45) Date of Patent: *Sep. 17, 2019

(54) USER TERMINAL, ELECTRONIC DEVICE, AND CONTROL METHOD THEREOF

(71) Applicant: Samsung Electronics Co., Ltd., Suwon-si, Gyeonggi-do (KR)

(72) Inventors: Young-kyu Jin, Seoul (KR); Young-ho Rhee, Yongin-si (KR); Young-shil Jang, Suwon-si (KR); Il-ku Chang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

This patent is subject to a terminal disclaimer.

(21) Appl. No.: 15/407,809

(22) Filed: Jan. 17, 2017

(65) Prior Publication Data

US 2017/0123610 A1 May 4, 2017

Related U.S. Application Data

(63) Continuation of application No. 14/385,413, filed as application No. PCT/KR2013/002289 on Mar. 20, 2012, now Pat. No. 9,582,150.

(30) Foreign Application Priority Data

Mar. 20, 2012 (KR) ........................ 10-2012-0028439

(51) Int. Cl.
*G06F 3/0482* (2013.01)
*G06F 3/0488* (2013.01)
(Continued)

(52) U.S. Cl.
CPC ............ *G06F 3/0482* (2013.01); *B60K 37/02* (2013.01); *G06F 3/0488* (2013.01);
(Continued)

(58) Field of Classification Search
CPC .................................................... G06F 3/0482
(Continued)

(56) References Cited

U.S. PATENT DOCUMENTS 7,663,607 B2 2/2010 Hotelling et al.
8,125,463 B2 * 2/2012 Hotelling .............. G06F 3/0416
345/173

(Continued)

FOREIGN PATENT DOCUMENTS

| | | |
|---|---|---|
| JP | 2003-244343 A | 8/2003 |
| JP | 2009/525538 A | 7/2009 |
| JP | 2012/043460 A | 3/2012 |

OTHER PUBLICATIONS

Bailly et al.; Comparing Free Hand Menu Techniques for Distant Displays Using Linear, Marking and Finger-Count Menus; Interact 2011, Part II, LNCS 6947; Sep. 5, 2011.
(Continued)

*Primary Examiner* — Reza Nabi
(74) *Attorney, Agent, or Firm* — Jefferson IP Law, LLP

(57) ABSTRACT

A method for controlling a user terminal is provided. The user terminal controlling method includes, when an external apparatus providing a UI screen is connected, providing a touch mode where a touch manipulation to navigate menu items provided on the UI screen is input, and when a predetermined touch manipulation is input in the touch mode, transmitting information corresponding to the input touch manipulation to the external apparatus.

11 Claims, 5 Drawing Sheets

(51) Int. Cl.
*G06F 3/0484* (2013.01)
*B60K 37/02* (2006.01)

(52) U.S. Cl.
CPC .... *G06F 3/04842* (2013.01); *B60K 2370/143* (2019.05); *B60K 2370/1438* (2019.05); *B60K 2370/152* (2019.05); *B60K 2370/1531* (2019.05); *B60Y 2400/92* (2013.01); *G06F 2203/04808* (2013.01)

(58) Field of Classification Search
USPC ........................................................ 715/841
See application file for complete search history.

(56) References Cited

U.S. PATENT DOCUMENTS

| | | | |
|---|---|---|---|
| 8,416,209 B2 | 4/2013 | Hotelling et al. | |
| 8,605,051 B2 | 12/2013 | Hotelling et al. | |
| 8,872,785 B2 | 10/2014 | Hotelling et al. | |
| 8,928,618 B2 | 1/2015 | Hotelling et al. | |
| 8,982,087 B2 | 3/2015 | Hotelling et al. | |
| 9,035,907 B2 | 5/2015 | Hotelling et al. | |
| 9,104,308 B2* | 8/2015 | Au | G06F 3/04883 |
| 9,454,277 B2 | 9/2016 | Hotelling et al. | |
| 2003/0156097 A1* | 8/2003 | Kakihara | G01C 21/3667 |
| | | | 345/156 |
| 2006/0097991 A1* | 5/2006 | Hotelling | G06F 3/0416 |
| | | | 345/173 |
| 2007/0143003 A1* | 6/2007 | Chien | G01C 21/3611 |
| | | | 701/532 |
| 2007/0177804 A1* | 8/2007 | Elias | G06F 3/04883 |
| | | | 382/188 |
| 2009/0062939 A1* | 3/2009 | Park | G08C 17/02 |
| | | | 700/83 |
| 2009/0066670 A1 | 3/2009 | Hotelling et al. | |
| 2009/0096757 A1 | 4/2009 | Hotelling et al. | |
| 2009/0096758 A1* | 4/2009 | Hotelling | G06F 3/0416 |
| | | | 345/173 |
| 2010/0127996 A1* | 5/2010 | Kitahara | G01C 21/3688 |
| | | | 345/173 |
| 2011/0090407 A1* | 4/2011 | Friedman | H04N 21/42204 |
| | | | 348/734 |
| 2011/0270600 A1 | 11/2011 | Bose et al. | |
| 2011/0271183 A1* | 11/2011 | Bose | G06F 3/038 |
| | | | 715/702 |
| 2012/0105371 A1 | 5/2012 | Hotelling et al. | |
| 2013/0106780 A1 | 5/2013 | Hotelling et al. | |
| 2013/0282283 A1* | 10/2013 | Bondesen | H04W 4/21 |
| | | | 701/537 |
| 2014/0062955 A1 | 3/2014 | Hotelling et al. | |
| 2014/0078108 A1 | 3/2014 | Hotelling et al. | |
| 2014/0288684 A1* | 9/2014 | Lewis | H04H 20/40 |
| | | | 700/94 |
| 2014/0300542 A1* | 10/2014 | Jakubiak | G06F 3/017 |
| | | | 345/157 |
| 2014/0300577 A1 | 10/2014 | Hotelling et al. | |
| 2014/0300578 A1 | 10/2014 | Hotelling et al. | |
| 2015/0089451 A1* | 3/2015 | Jin | G06F 3/0488 |
| | | | 715/841 |
| 2015/0199053 A1 | 7/2015 | Hotelling et al. | |
| 2016/0054807 A1* | 2/2016 | Flagg | G06F 3/017 |
| | | | 345/158 |
| 2017/0010746 A1 | 1/2017 | Hotelling et al. | |

OTHER PUBLICATIONS

Gilles Bailly et al: "Finger-count & radial-stroke shortcuts", CHI 2010INPUT, Security, and Privacy Policies, ACM, Atlanta, GA, USA, Apr. 10, 2010 (Apr. 10, 2010), pp. 591-594, XP058405008.
Hanqing Ruan et al: "Touch Interact: An Interaction Technique with Large Displays Using Touchscreen-Phone", Ubiquitous Intelligence & Computing and 7th International Conference on Autonomic & Trusted Computing (UIC/ATC), 2010 7th International Conference on, IEEE, Piscataway, NJ, USA, Oct. 26, 2010 (Oct. 26, 2010), pp. 262-265, XP031834874,.
David Mccallum et al: "ARC-Pad: Absolute+ Relative Cursor Positioning for Large Displays with a Mobile Touchscreen", Oct. 7, 2009 (Oct. 7, 2009), pp. 153-156, XP055580721.
European examination report dated Apr. 18, 2019, issued in European Application No. 13764852.3.

* cited by examiner

[Fig. 1]
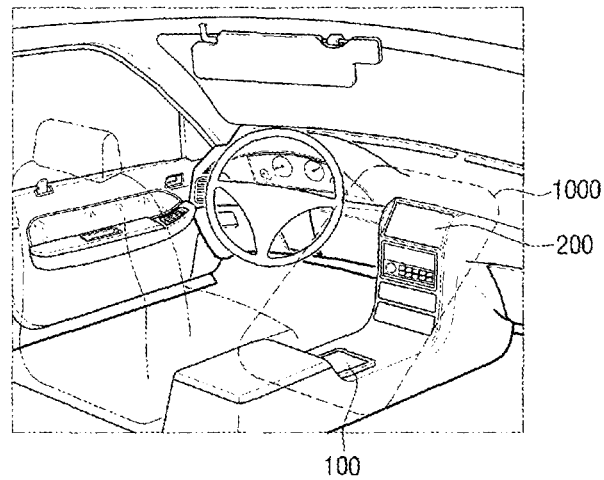
[Fig. 2]
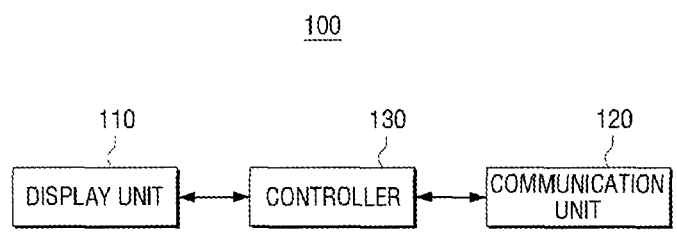
[Fig. 3]
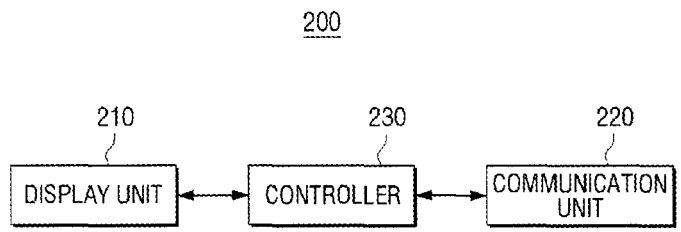
[Fig. 4]
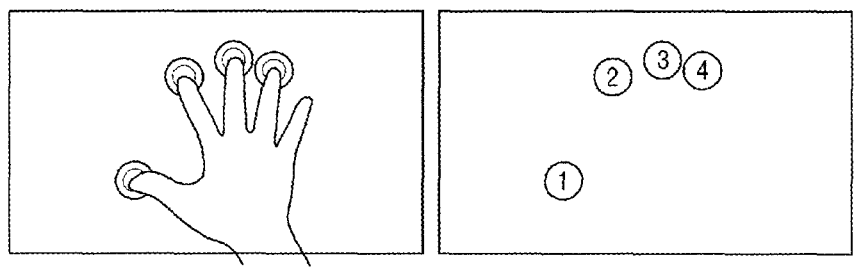

[Fig. 5A]
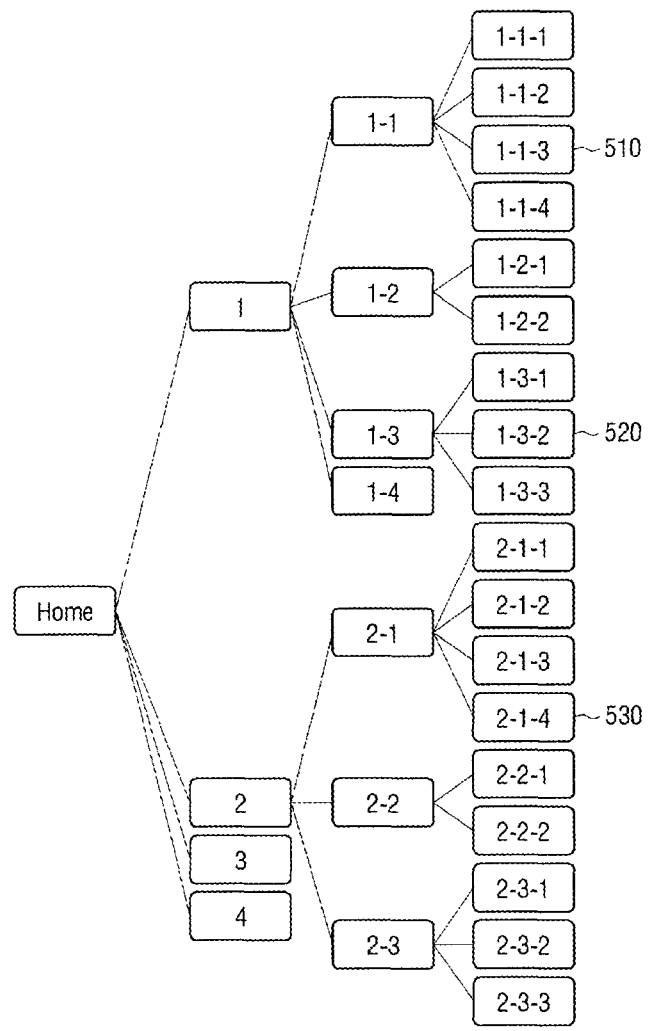
[Fig. 5B]
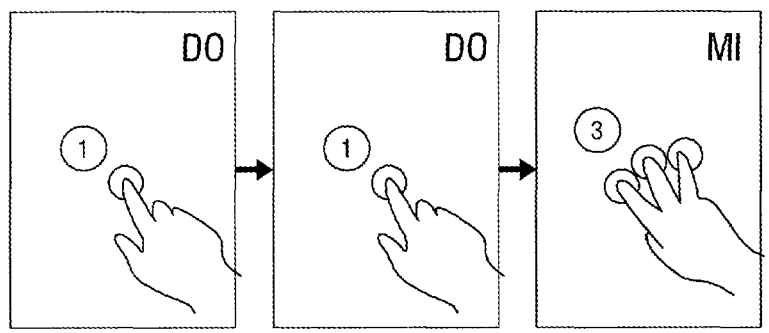

[Fig. 5C]
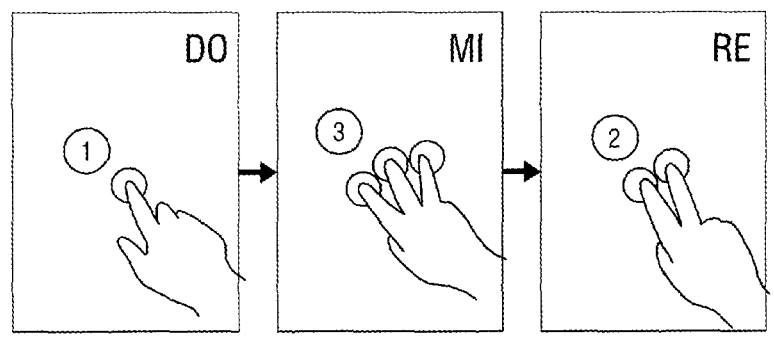
[Fig. 5D]
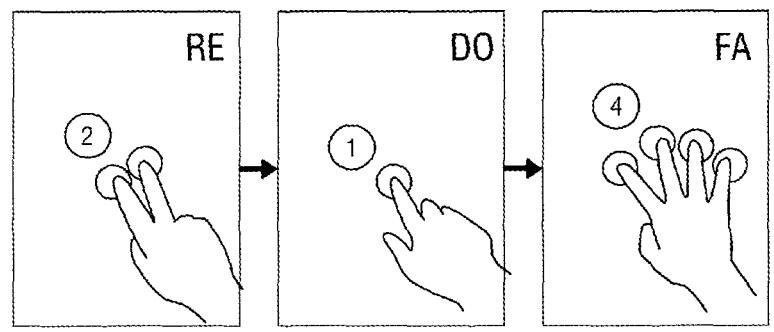

[Fig. 6]
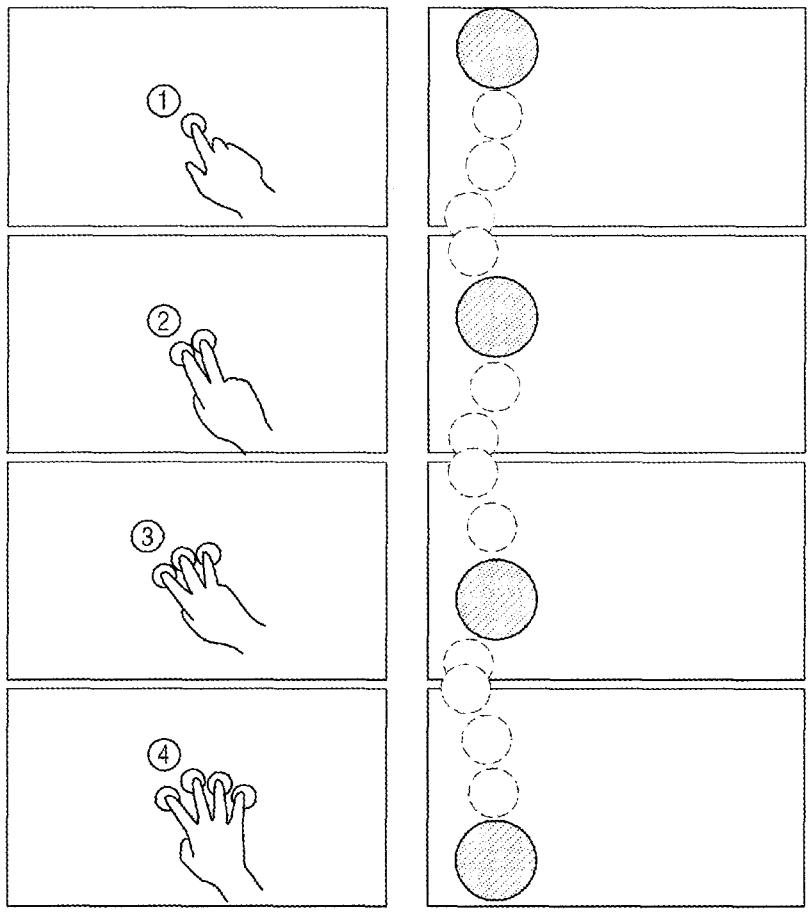
[Fig. 7]
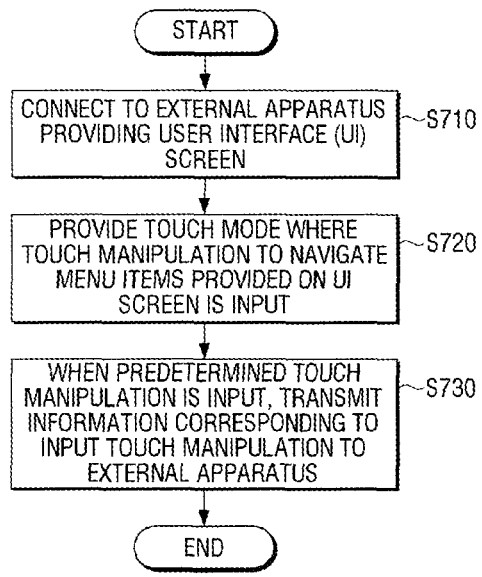

[Fig. 8]
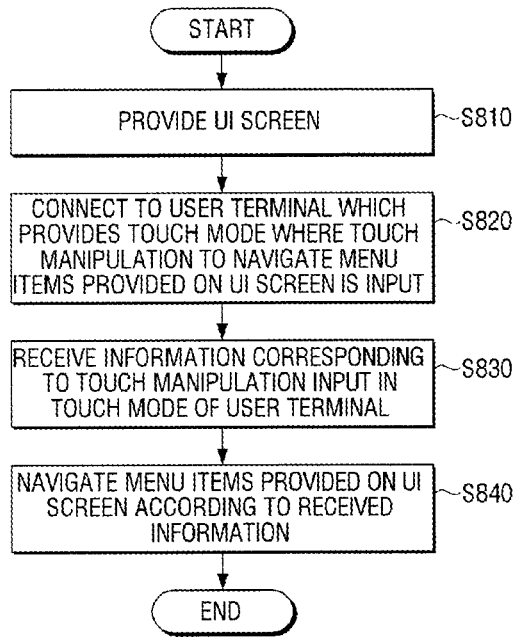
[Fig. 9]
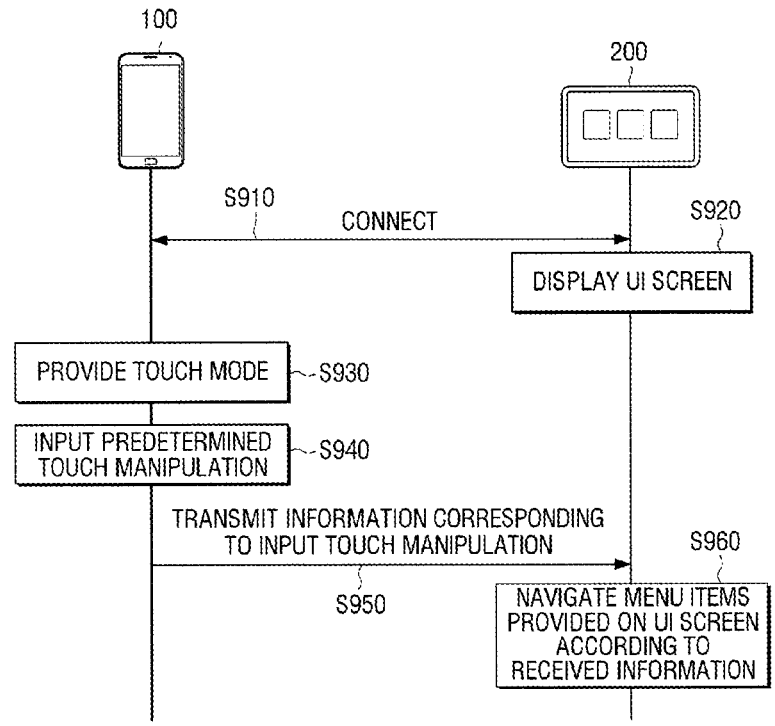

USER TERMINAL, ELECTRONIC DEVICE, AND CONTROL METHOD THEREOF

CROSS-REFERENCE TO RELATED APPLICATIONS

This application is a continuation application of prior application Ser. No. 14/385,413, filed on Sep. 15, 2014, claiming the benefit under § 365(c), of an International application filed on Mar. 20, 2013 and assigned application number PCT/KR2013/002289, which claimed the benefit of a Korean patent application filed on Mar. 20, 2012 in the Korean Intellectual Property Office and assigned Serial number 10-2012-0028439, the entire disclosure of each of which is hereby incorporated by reference.

BACKGROUND OF THE INVENTION

1. Field of the Invention

Aspects of the exemplary embodiments relate to a user terminal, an electronic apparatus, and a control method thereof, and more particularly, to a user terminal which is capable of controlling an electronic apparatus, an electronic apparatus, and a controlling method thereof.

2. Description of the Related Art

With the development of electronic technology, various types of electronic apparatuses are mounted in a car and used therein. One of those apparatuses is a navigation device. The navigation device recognizes the current location of a vehicle and guides a user to the path to a destination using map information.

Thus, a user is able to derive the vehicle to the destination according to the guidance of the navigation device. Recently, a navigation device provides not only basic navigation functions but also various functions such as receiving DMB broadcasting and reproducing video and audio files. Such a navigation device may be installed inside a vehicle as a separate device, but also be installed integrally with the vehicle.

Meanwhile, when a user wishes to manipulate a navigation device, he or she needs to watch and touch the screen of the navigation device while driving the car, and thus there is high risk of getting involved with a car accident and actually, there are a lot of car accident taking place due to the above-mentioned problem.

Therefore, a method for preventing the risk of using navigation while deriving and enhancing user convenience at the same time is required.

SUMMARY OF THE INVENTION

Aspects of the exemplary embodiments relate to a user terminal which allows a user to manipulate a User Interface (UI) screen without watching the UI screen of an electronic apparatus, an electronic apparatus, and a control method thereof.

A method for controlling a user terminal according to an exemplary embodiment includes, when an external apparatus providing a UI screen is connected, providing a touch mode where a touch manipulation to navigate menu items provided on the UI screen is input, and when a predetermined touch manipulation is input in the touch mode, transmitting information corresponding to the input touch manipulation to the external apparatus.

The information corresponding to a touch manipulation may be at least one of a number of touch manipulations and a number of touch points input at a time, and the number of touch manipulations may navigate a depth of the menu items and the number of touch points input at a time may navigate menu items provided in a same depth.

The method may further include receiving information regarding the UI screen from the external apparatus, and when a touch manipulation is input in the touch mode, comparing information corresponding to the input touch manipulation with the received information regarding a UI screen, and the transmitting information corresponding to the input touch manipulation to the external apparatus may include transmitting information corresponding to the input touch manipulation to the external apparatus according to a result of the comparison.

The information regarding a UI screen may be information regarding an item currently selected on a menu provided on the UI screen and a number of sub menu items of the selected item, and the information corresponding to a touch manipulation may be at least one of a number of touch manipulations and a number of touch points input at a time.

The comparing information corresponding to the input touch manipulation with the received information regarding a UI screen may include comparing the number of touch points with the number of sub menu items of the selected item.

If the number of touch points exceeds the number of sub menu items of the selected item based on the comparison result, an error message may be output, and if the number of touch points does not exceed a number of sub menu items of the selected item, the number of touch points may be transmitted to the external apparatus.

The external apparatus may be a center fascia screen apparatus of a vehicle.

A method for controlling an electronic apparatus which is interlocked with a user terminal according to an exemplary embodiment includes providing a UI screen, performing connection with a user terminal which provides a touch mode where a touch manipulation to navigate menu items provided on the UI screen is input, receiving information corresponding to a touch manipulation input in a touch mode of the user terminal, and navigating menu items provided on the UI screen according to the received information.

The information corresponding to a touch manipulation may be at least one of a number of touch manipulations and a number of touch points input at a time, and the number of touch manipulations may navigate a depth of the menu items and the number of touch points input at a time may navigate menu items provided in a same depth.

The electronic apparatus may be a center fascia screen apparatus of a vehicle.

A user terminal according to an exemplary embodiment includes a communication unit which performs communication with an external apparatus providing a UI screen, a display unit which provides a touch mode where a touch manipulation to navigate menu items provided on the UI screen is input, and a controller which, when it is connected to the external apparatus, provides the touch mode, and when a predetermined touch manipulation is input in the touch mode, controls to transmit information corresponding to the input touch manipulation to the external apparatus.

The information corresponding to a touch manipulation may be at least one of a number of touch manipulations and a number of touch points input at a time, and the number of touch manipulations may navigate a depth of the menu items and the number of touch points input at a time may navigate menu items provided in a same depth.

The controller, when information regarding the UI screen is received from the external apparatus and a touch manipulation is input in the touch mode, may control to compare information corresponding to the input touch manipulation with the received information regarding the UI screen and transmit information corresponding to the input touch manipulation to the external apparatus.

The information regarding the UI screen may be information regarding an item which is currently selected on a menu provided on the UI screen and a number of sub menu items of the selected item, and the information corresponding to a touch manipulation may be at least one of a number of touch manipulations and a number of touch points input at a time.

An electronic apparatus according to an exemplary embodiment includes a display unit which provides a UI screen, a communication unit which performs communication with a user terminal providing a touch mode where a touch manipulation to navigate menu items provided on the UI screen is input, and a controller which, when information corresponding to a touch manipulation input in a touch mode of the user terminal is received, navigates menu items provided on the UI screen according to the received information.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 1 is a schematic view illustrating configuration of a control system according to an exemplary embodiment;

FIG. 2 is a block diagram illustrating configuration of a user terminal according to an exemplary embodiment;

FIG. 3 is a block diagram illustrating configuration of an electronic apparatus according to an exemplary embodiment;

FIG. 4 is a view provided to explain a form of touch manipulation according to an exemplary embodiment;

FIGS. 5A to 5D are views provided to explain a menu item navigation method according to an exemplary embodiment;

FIG. 6 is a view provided to explain a method for providing a UI screen according to an exemplary embodiment;

FIG. 7 is a flowchart provided to explain a method for controlling a user terminal according to an exemplary embodiment;

FIG. 8 is a flowchart provided to explain a method for controlling an electronic apparatus which is interlocked with a user terminal according to an exemplary embodiment; and FIG. 9 is a sequence view provided to explain an operation of a control system including a user terminal and an electronic apparatus according to an exemplary embodiment.

DETAILED DESCRIPTION

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a schematic view illustrating configuration of a control system according to an exemplary embodiment.

Referring to FIG. 1, a control system 1000 comprises a user terminal 100 and an electronic apparatus 200.

The user terminal receives a user command to manipulate a User Interface (UI) screen provided by the electronic apparatus 200 and transmits it to the electronic apparatus 200.

Specifically, once the user terminal 100 is connected to the electronic apparatus 200, the user terminal 100 may provide a touch mode where a touch manipulation to navigate menu items provided on the UI screen of the electronic apparatus 200 is input.

In addition, when a predetermined touch manipulation is input in the touch mode, the user terminal 100 may transmit information corresponding to the input touch manipulation to the electronic apparatus 200.

Meanwhile, the user terminal 100 may be realized in various forms such as a mobile phone, a notebook computer, a PMP, an MP3, and so on, but is not limited thereto as long as it includes a touch pad.

The electronic apparatus 200 provides a UI screen which can be manipulated in the user terminal 100, and herein the UI screen may include various menu items.

In addition, the electronic apparatus 200 may be connected to the user terminal 100 which provides a touch mode where a touch manipulation to navigate menu items provided in the UI screen is input.

The electronic apparatus 200 may also receive information corresponding to a touch manipulation input in the touch mode of the user terminal 100 and navigate menu items provided on the UI screen according to the received information.

Meanwhile, the electronic apparatus 200 may be realized as a center fascia screen apparatus in a vehicle, but may also be an apparatus providing a UI which can be controlled by a touch manipulation input in the user terminal 100. Herein, the center fascia refers to the front portion of the vehicle interior between the driver seat and the passenger seat where devices such as an audio, an air conditioner, a navigation, etc. are located. The center fascia screen apparatus may be an audio, navigation, and so on.

FIG. 2 is a block diagram illustrating configuration of a user terminal according to an exemplary embodiment.

Referring to FIG. 2, the user terminal 100 comprises a communication unit 110, a display unit 120, and a controller 130.

The communication unit 110 communicates with the external apparatus 200 which provides a UI screen.

In particular, the communication unit 110 performs connection to the external apparatus 200 and then, transmits an event occurring in the display unit 120 which will be explained later to the external apparatus 200.

Herein, the communication unit 110 may be realized as a Bluetooth communication module, a Wi-Fi communication module, and a USB communication module, and so on. Accordingly, the communication unit 110 may perform communication with the electronic apparatus 100 using a notified wired or wireless protocol such as Bluetooth, Wireless Fidelity (Wi-Fi), other USB standard Internet, LAN, Ethernet, TCP/IP, IPX, FireWire, IEEE 1394, iLink, CDMA, TDMA, High Definition Multimedia Interface (HDMI-CEC), Wireless HDMI-CEC, Radio Frequency (RF), and so on.

The display unit 120 may display various information provided by the user terminal 100.

However, when the display unit 120 is connected to the external apparatus 200, the display unit 120 may provide a touch mode where a user touch command to manipulate a UI screen provided by the external apparatus 200 is input.

Herein, the display unit 120 may be realized as a touch screen which forms an interlayer structure with respect to a touch pad. In this case, the display unit 120 may perform not only an output function but also the functions of a user interface which will be explained later. In addition, the touch screen may be configured to detect not only the location and size of a touch input but also the pressure of a touch input.

The controller 130 controls overall operations of the user terminal 100.

In particular, if the controller 130 is connected to the external apparatus 200, the controller may control the display unit 120 to provide a touch mode where a user touch command to manipulate a UI screen provided by the external apparatus 200 is input.

In addition, if a predetermined touch manipulation is input, the controller 130 may control the communication unit 110 to transmit information corresponding to the input touch manipulation to the external apparatus 200.

Herein, the information corresponding to a touch manipulation may be at least one of the number of touch manipulations and the number of touch points which are input at a time.

In this case, the number of touch manipulations may navigate the depth of menu items, and the number of touch points which are input may navigate menu items provided in the same depth.

In addition, when information regarding a UI screen is received from the external apparatus 200, the controller 130 may compare information corresponding to an input manipulation with information regarding the received UI screen and control to transmit information corresponding to the input touch manipulation to the external apparatus based on the comparison result.

Herein, the information regarding the UI screen may be information regarding an item which is currently selected on the menus provided by the UI screen and information regarding the number of sub-menu items of the selected item.

In this case, the controller 130 may compare the number of touch points and the number of sub-menu items of the currently-selected item.

Based on the comparison result, if the number of touch points does not exceed the number of sub-menu items of the currently-selected item on the UI screen, the controller 130 may control to transmit the number of touch points to the external apparatus 200.

Alternatively, if the number of touch points exceeds the number of sub-menu items of the selected item, the controller 130 may control to output an error message.

Meanwhile, various manipulation methods which will be explained later may be used when moving from a sub menu to an upper menu.

According to an exemplary embodiment, a specific touch manipulation may be set as a command to move to an upper step in advance.

For example, it may be predetermined that the touch gesture of sweeping from right to left is a command to move to an upper step. In addition, with reference to information received from the electronic apparatus 200, a command to move to an upper step may be automatically set according to the number of sub-menu items of a currently-highlighted menu item. For example, if there are 3 sub-menu items, a touch manipulation of 4 points which are not used may be set as a command to move to an upper step.

Meanwhile, a touch manipulation to execute a selected item may be set. For example, the gesture of sweeping from top to bottom may be set as a command to execute the corresponding menu item.

In addition, a touch manipulation to move a current highlight key position to an uppermost item (for example, a home menu) may be set. For example, the gesture of swing from bottom to top may be set as a command to execute the corresponding menu item.

However, the above-described touch gestures are only examples, and various other touch gestures may be set as a specific user command. In addition, it is possible to set/change a touch gesture in various ways according to a user setting.

FIG. 3 is a block diagram illustrating configuration of an electronic apparatus according to an exemplary embodiment.

Referring to FIG. 3, the electronic apparatus 200 comprises a display unit 310, a communication unit 320 and a controller 330. Herein, the electronic apparatus 200 may be a center fascia screen apparatus of a vehicle.

The display unit 210 displays various UI screens provided by the electronic apparatus 200. Herein, the display unit 210 may be realized as at least one of a thin film transistor-liquid crystal display, an organic light-emitting diode, a flexible display, and a 3D display. In addition, the display unit 210 may be realized as a touch screen which forms an interlayer structure with respect to a touch pad.

Meanwhile, the UI screen provided by the display unit 210 may include menu items which are configured to have a predetermined depth. In this case, the menu items are displayed such that whether the menu items are selected or not is identified using highlight.

The communication unit 220 performs communication with the user terminal 100 which receives a user command to navigate menu items provided on the UI screen.

Herein, the user terminal 100 may provide a touch mode where a touch manipulation to navigate menu items provided on the UI screen is input.

In this case, the communication unit 220 may receive information corresponding to a touch manipulation input in the touch mode of the user terminal 100.

When information corresponding to a touch manipulation input in the touch mode of the user terminal 100 is received through the communication unit 220, the controller 230 navigates menu items provided on the UI screen according to the received information.

Herein, the information corresponding to a touch manipulation may be at least one of the number of touch manipulations and the number of touch points which are input at a time.

In this case, the controller 230 may navigate the depth of the menu items based on the number of touch manipulations, and navigate the menu items provided in the same depth based on the number of touch points which are input at a time. This will be explained later in greater detail with reference to the corresponding drawings.

Although not illustrated in the drawings, the electronic apparatus 200 may further comprise a UI processor (not shown).

The UI processor (not shown) performs the function of processing/generating various UI screens in 2D or 3D form. Herein, the UI screen may be a menu screen including a plurality of menu items, but is not limited thereto. That is, the UI screen may be a screen displaying a warning sentence and texts or diagrams such as time or channel number.

In addition, the UI processor (not shown) may perform such operations as 2D/3D conversion of UI elements, adjustment of transparency, color, size, shape, and location, highlight, and animation effect under the control of the controller 130.

FIG. 4 is a view provided to explain a form of touch manipulation according to an exemplary embodiment.

As illustrated in FIG. 4, a user may navigate menus included in a UI screen provided by the electronic apparatus 200 using a touch manipulation with a few fingers while the user terminal 100 provides a touch mode.

That is, a user may navigate menu items included in a UI screen provided by the electronic apparatus 200 by touching the screen of the user terminal 100 which provides a touch mode with fingers in series or at once as if playing a piano.

In this case, according to the number of fingers touching the screen, an audio feedback may be provided so as to make the user feel as if he or she is playing a piano, thereby enhancing reliability of interaction.

FIGS. 5A to 5D are views provided to explain a menu item navigation method according to an exemplary embodiment.

As illustrated in FIG. 5A, the electronic apparatus 200 connected to the user terminal 100 provides a plurality of menu items having predetermined depths, and the it is assumed that the provided menus display a home menu.

As illustrated in FIG. 5B, if the user terminal 100 performs touch manipulates in the order of one point touch→one point touch→three point touch, menu items corresponding to 1-1-3 (510) may be selected on the menu illustrated in FIG. 5A. That is, if there is one point touch (corresponding to "do" in the case of a piano keyboard), the menu item 1 corresponding to one point touch from among the menu items of 1, 2, 3 and 4 having the first depth is selected, and if there are two point touches (corresponding to "do" in the case of a piano keyboard), the sub-level of the selected menu item 1, that is, the menu item of 1-1 corresponding to one point touch from among the menu items of 1-1, 1-2, 1-3, and 1-4 having the second depth may be selected. Subsequently, if there are three point touches (corresponding to "mi" in the case of a piano keyboard), the sub-level of the selected menu item 1-1, that is, the menu item of 1-1-3 (510) corresponding to three touch points from among the menu items of 1-1-1, 1-1-2, 1-1-3, and 1-1-4 having the third depth may be selected.

As illustrated in FIG. 5C, if the user terminal 100 touches the screen in the order of one point touch→three point touches→two point touches, the menu item corresponding to 1-3-2 (520) may be selected on the menu illustrated in FIG. 5A. That is, if there is one point touch (corresponding to "do" in the case of a piano keyboard), the menu item corresponding to the one point touch from among the menu items 1, 2, 3, and 4 which belong to the first depth may be selected, and if there are three second point touches, the sub-level of the selected menu item 1, that is, the menu item 1-3 corresponding to the three touch points from among the menu items 1-1, 1-2, 1-3, and 1-4 which belong to the second depth may be selected. If there are two third point touches, the sub-level of the selected menu item 1-3, that is, the menu item 1-3-2 (520) corresponding to the two point touches from among the menu items 1-3-1 and 1-3-2 which belong to the third depth may be selected.

As illustrated in FIG. 5D, when the user terminal 100 is touched in the order of two point touches→one point touch→and four point touches, the menu item corresponding to 2-1-4 (530) may be selected on the menu illustrated in FIG. 5A. That is, if there are two point touches initially (corresponding to 're' in the case of a piano keyboard), the menu item 2 corresponding to the two point touches from among the menu items 1, 2, 3, and 4 which belong to the first depth is selected, and if there are one second point touch (corresponding to "do" in the case of a piano keyboard), the sub-level of the selected menu item 2, that is, the menu item 2-1 corresponding to the one point touch from among the menu items 2-1, 2-2 and 2-3 which belong to the second depth may be selected. If there are four third point touches (corresponding to "fa" in the case of a piano keyboard), the sub-level of the selected menu item 2-1, that is, the menu item 2-1-4 (530) corresponding to the four point touches from among the menu items 2-1-1-, 2-1-2, 2-1-3, and 2-1-4 which belong to the third depth may be selected.

As illustrated in FIGS. 5B to 5D, menu items in the same depth level may be selected according to the number of touch points which are touched at once, and menu items in different depths may be selected according to the number of touches which are touched with time intervals.

FIG. 6 is a view provided to explain a method for providing a UI screen according to an exemplary embodiment.

As illustrated in FIG. 6, the UI screen of the electronic apparatus 200 (right drawing) may be displayed in various forms according to a touch manipulation (left drawing) in the user terminal 100.

FIG. 6 illustrates an example of a UI screen, if the menu screen has menu items in the form of waterdrop which are disposed sequentially, the form of waterdrop of the corresponding menu items may be changed according to a touch manipulation (left drawing) in the user terminal 100.

Specifically, if there is one touch point manipulation in the user terminal 100, the shape of waterdrop of the first menu item may be magnified and highlighted.

Subsequently, if there are two touch point manipulations, the shape of the first menu item may be restored to its original shape, and the shape of waterdrop of the second menu item corresponding to the two touch point manipulations may be magnified and highlighted.

If there are three or four touch point manipulations, the shape of menu items may be changed in the similar manner.

FIG. 7 is a flowchart provided to explain a method for controlling a user terminal according to an exemplary embodiment.

According to the method for controlling a user terminal illustrated in FIG. 7, when an external apparatus providing a UI screen is connected (S710), a touch mode where a touch manipulation to navigate menu items provided on the UI screen is input is provided (S720). Herein, the external apparatus may be realized as a center fascia screen apparatus of a vehicle, but is not limited thereto. Specifically, the external apparatus may be any apparatus which displays a UI screen controller by a manipulation of a user terminal.

Herein, when a predetermined touch manipulation is input in the touch mode, information corresponding to the input touch manipulation is transmitted to the external apparatus (S730).

In this case, the information corresponding to the touch manipulation may be at least one of the number of touch manipulations and the number of touch points input at once.

In addition, the number of touch manipulations may navigate the depth of menu items, and the number of touch points input at once may navigate menu items provided in the same depth.

Further, when information regarding a UI screen is received from the external apparatus and a touch manipulation is input in the touch mode, information corresponding to the input touch manipulation may be compared with the received information regarding the UI screen. Subsequently, the information corresponding to the input touch manipulation may be transmitted to the external apparatus based on the result of comparison.

Herein, the information regarding a UI screen may be information regarding an item which is currently selected on a menu provided by the UI screen and information regarding the number of sub menu items of the selected item. In addition, the information corresponding to the touch manipulation may be at least one of the number of touch manipulations and the number of touch points input at a time.

In this case, the number of touch points and the number of sub menu items of the selected item may be compared, and information corresponding to the touch manipulation may be transmitted to an external apparatus based on the result of the comparison.

Specifically, if the number of touch points exceeds the number of sub menu items of the selected item based on the comparison result, an error message may be output. In addition, if the number of touch points does not exceed the number of sub menu items of the selected item, the number of touch points may be transmitted to an external apparatus.

FIG. 8 is a flowchart provided to explain a method for controlling an electronic apparatus which is interlocked with a user terminal according to an exemplary embodiment.

According to the method for controlling an electronic apparatus which is interlocked with a user terminal illustrated in FIG. 8, first of all, a UI screen is provided (S810), and a user terminal which provides a touch mode where a touch manipulation for navigating menu items provided on the UI screen is input is connected (S820). Herein the electronic apparatus is realized as a center fascia screen apparatus, but is not limited thereto.

Subsequently, information corresponding to a touch manipulation input in the touch mode of the user terminal is received (S830).

The menu items provided on the UI screen are navigated according to the received information (S840).

Herein, the information corresponding to the touch manipulation may be at least one of the number of touch manipulations and the number of touch points input at a time.

In addition, the number of touch manipulations may navigate the depth of menu items, and the number of touch points input at once may navigate menu items provided in the same depth.

FIG. 9 is a sequence view provided to explain an operation of a control system including a user terminal and an electronic apparatus according to an exemplary embodiment.

According to an operation of a user terminal and an electronic apparatus illustrated in FIG. 9, the user terminal 100 is connected to the electronic apparatus 200 providing a UI screen (S910), and a UI screen may be displayed on the electronic apparatus 200 (S920). In this case, the order of step S910 and S920 is not fixed, which is obvious to those skilled in the related art.

Subsequently, the user terminal 100 may provide a touch mode for manipulating a UI screen of the electronic apparatus 200 (S930).

When a predetermined touch manipulation is input in the touch mode of the user terminal 100 (S940), information corresponding to the input touch manipulation is transmitted to the electronic apparatus 200 (S950). In this case, the electronic apparatus 200 may navigate menu items provided on the UI screen according to the received information (S960).

As described above, according to an exemplary embodiment, a method for manipulating a UI remotely using a piano metaphor method may be provided.

Accordingly, a user may access to a desired function more rapidly and accurately without watching a screen, unlike the existing interaction where the user touches a touch screen and selects a desired function thereon. A user may select a desired function more rapidly once he or she is accustomed to the method, as if playing a musical instrument.

The above methods according to various exemplary embodiments may be realized simply by upgrading software regarding the existing device or user terminal.

A program to perform the above various methods may be stored and used in various types of recording medium.

Specifically, the program may be stored and provided in various types of recording medium which is readable by a terminal, such as Random Access Memory (RAM), flash memory, Read Only Memory (ROM), Erasable Programmable ROM (EPROM), Electronically Erasable and Programmable ROM (EEPROM), register, hard disk, removable disk, memory card, USB memory, CD-ROM, and so on.

The foregoing embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. A method for controlling a user terminal, comprising:
   when an external apparatus providing a UI screen is connected, providing a touch mode where a touch manipulation to navigate menu items provided on the UI screen is input; and
   when a predetermined touch manipulation is input in the touch mode, transmitting information corresponding to the input touch manipulation to the external apparatus,
   wherein the external apparatus is a center fascia screen apparatus of a vehicle, and
   wherein, when the touch manipulation is input in the touch mode, comparing information corresponding to the input touch manipulation with the receiving information regarding the UI screen by comparing a number of touch points with a number of sub menu items of the selected item.

2. The method as claimed in claim 1, wherein the information corresponding to a touch manipulation is at least one of a number of touch manipulations and the number of touch points input at a time,
   wherein the number of touch manipulations navigates a depth of the menu items and the number of touch points input at a time navigates menu items provided in a same depth.

3. The method as claimed in claim 1, further comprising:
   receiving information regarding the UI screen from the external apparatus,
   wherein the transmitting information corresponding to the input touch manipulation to the external apparatus comprises transmitting information corresponding to the input touch manipulation to the external apparatus according to a result of the comparison.

4. The method as claimed in claim 3,
wherein the information regarding a UI screen is information regarding an item currently selected on a menu provided on the UI screen and the number of sub menu items of the selected item,
wherein the information corresponding to a touch manipulation is at least one of a number of touch manipulations and the number of touch points input at a time.

5. The method as claimed in claim 4, wherein if the number of touch points exceeds the number of sub menu items of the selected item based on the comparison result, an error message is output, and
if the number of touch points does not exceed the number of sub menu items of the selected item, the number of touch points is transmitted to the external apparatus.

6. A method for controlling an electronic apparatus which is interlocked with a user terminal, comprising:
providing a UI screen;
performing connection with a user terminal which provides a touch mode where a touch manipulation to navigate menu items provided on the UI screen is input;
receiving information corresponding to a touch manipulation input in a touch mode of the user terminal; and
navigating menu items provided on the UI screen according to the received information,
wherein the electronic apparatus is a center fascia screen apparatus of a vehicle, and
wherein, when the touch manipulation is input in the touch mode, comparing information corresponding to the input touch manipulation with the receiving information regarding the UI screen by comparing a number of touch points with a number of sub menu items of the selected item.

7. The method as claimed in claim 6,
wherein the information corresponding to a touch manipulation is at least one of a number of touch manipulations and the number of touch points input at a time,
wherein the number of touch manipulations navigates a depth of the menu items and the number of touch points input at a time navigates menu items provided in a same depth.

8. A user terminal, comprising:
a communicator which performs communication with an external apparatus providing a UI screen;
a display which provides a touch mode where a touch manipulation to navigate menu items provided on the UI screen is input; and
a controller which, when it is connected to the external apparatus, provides the touch mode, and when a predetermined touch manipulation is input in the touch mode, controls to transmit information corresponding to the input touch manipulation to the external apparatus,
wherein the external apparatus is a center fascia screen apparatus of a vehicle, and
wherein, when the touch manipulation is input in the touch mode, comparing information corresponding to the input touch manipulation with the receiving information regarding the UI screen by comparing a number of touch points with a number of sub menu items of the selected item.

9. The user terminal as claimed in claim 8,
wherein the information corresponding to a touch manipulation is at least one of a number of touch manipulations and the number of touch points input at a time,
wherein the number of touch manipulations navigates a depth of the menu items and the number of touch points input at a time navigates menu items provided in a same depth.

10. The user terminal as claimed in claim 8, wherein the controller, when information regarding the UI screen is received from the external apparatus and the touch manipulation is input in the touch mode, controls to compare information corresponding to the input touch manipulation with the received information regarding the UI screen and transmit information corresponding to the input touch manipulation to the external apparatus.

11. The user terminal as claimed in claim 10,
wherein the information regarding the UI screen is information regarding an item which is currently selected on a menu provided on the UI screen and the number of sub menu items of the selected item,
wherein the information corresponding to a touch manipulation is at least one of a number of touch manipulations and the number of touch points input at a time.

* * * * *